June 30, 1964   J. E. LEGOCKI   3,139,196
AUTOMATIC BALE PILER
Filed Feb. 14, 1961   6 Sheets-Sheet 3

Joe E. Legocki
INVENTOR.

BY *Clarence A. O'Brien*
*and Harvey B. Jacobson*
Attorneys

Joe E. Legocki
INVENTOR.

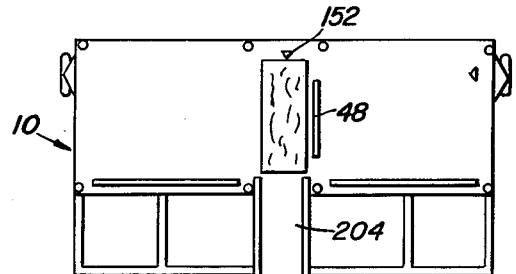
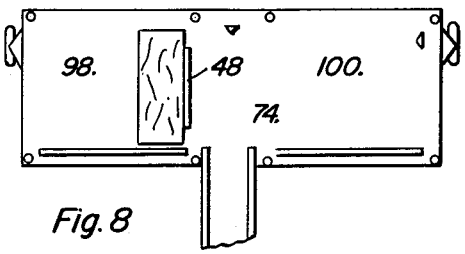
Fig. 8
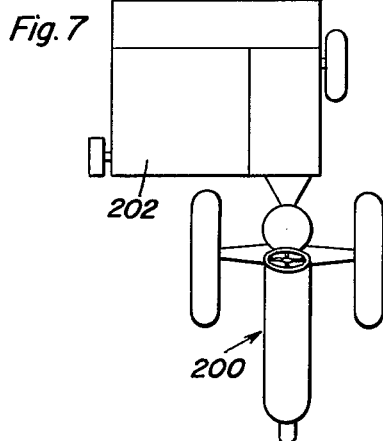
Fig. 7
Fig. 9
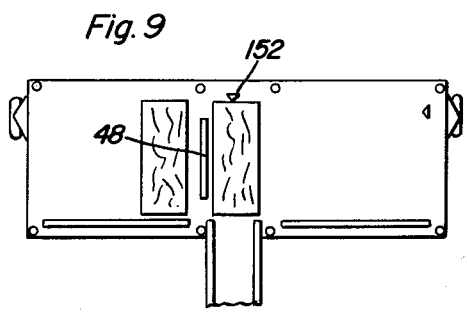
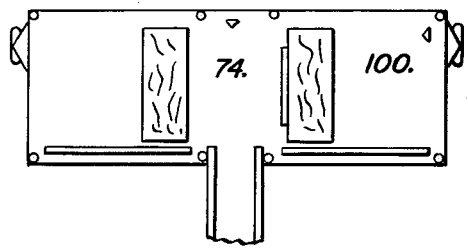
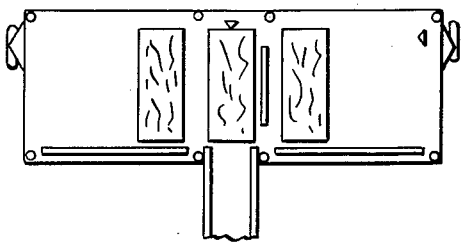
Fig. 10          Fig. 11
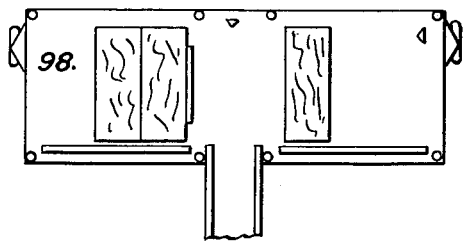
Fig. 12
Joe E. Legocki
INVENTOR.

June 30, 1964 J. E. LEGOCKI 3,139,196
AUTOMATIC BALE PILER
Filed Feb. 14, 1961 6 Sheets-Sheet 6

Joe E. Legocki
INVENTOR.

BY Clarence A. O'Brien
and Harvey B. Jacobson
Attorneys

3,139,196
AUTOMATIC BALE PILER
Joe E. Legocki, Rte. 1, Box 288, Sheridan, Wyo., assignor of fifteen percent each to Paul Koltiska, Jr., George Koltiska, and A. W. Peterson, all of Sheridan, Wyo.
Filed Feb. 14, 1961, Ser. No. 89,139
6 Claims. (Cl. 214—6)

This invention relates to a machine adapted to be hitched rearwardly of a baler for the purpose of receiving therefrom bales of hay, straw or the like to collect a predetermined number of bales and then automatically discharge them and thereby deposit the bales from the tractor drawn baler within windrows throughout the field.

It is therefore a primary object of this invention to provide a machine adapted to be hitched to a tractor drawn baler to not only discharge a predetermined number of bales received from the baler in an automatic fashion but to also neatly stack the bales prior to discharge or explusion thereof from the machine.

Another object of this invention is to provide an automatic bale piling machine which is automatically operative to receive, assemble and discharge the bales collected there within into a windrow. The machine requires no manual supervision or control and operates in a sequential manner solely under the control of the bales received there within from the baler. Discharge of the bales occurs only when the machine receives the predetermined number of bales for which it is designed.

An additional object of this invention in accordance with the foregoing objects, is to provide a bale windrowing machine which comprises a wheeled carrier frame including a centrally disposed bale receiving area which is aligned with the outlet end of the baler for receiving therefrom the bales. The bales as they enter the receiving area of the machine will be pushed rearwardly to form a bottom line and thereafter a second vertically stacked line of bales is formed above the bottom line. The rear and uppermost bale when it completely fills the receiving space of the machine actuates a trigger mechanism operatively connected to a reversible valve mechanism which initiates movement of a hydraulic piston mechanism which in turn laterally shifts the vertically stacked row of bales received within the receiving space into a collection space disposed laterally on either side of the receiving space within the carrier frame of the machine. The gate mechanism which laterally moves the row of bales within the receiving space is accordingly movable between two positions defining the opposite parallel sides of the receiving space.

Accordingly, after the first row of bales are displaced to one side of the receiving space the next row of bales will be displaced on the other side of the receiving space. The gate mechanism accordingly reverses the action of the control valve in order to reverse the direction of operation of the hydraulic piston mechanism each time the gate is moved from one side to the other side of the receiving space. The bale row displacing procedure continues until the collection spaces on either side of the receiving space are filled with rows of bales so that the rear uppermost and most laterally displaced bale within one of the collection spaces engages a trigger mechanism on one lateral side of the carrier frame of the machine to cause pusher gates slidably mounted and disposed forwardly of the collection spaces, to be displaced rearwardly causing the bales collected within the collection spaces to be discharged out the open rear sides of the collection spaces. It will therefore be apparent that operation of the machine is sequential and is controlled by reception within the carrier frame of a predetermined number of bales.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is a sectional view taken substantially through a plane indicated by section line 5—5 in FIGURE 2.

FIGURES 7–19 are schematic phase diagrams of the machine illustrating the sequential automatic operations thereof with the reception of a row of bales from the baler as illustrated in FIGURE 7 to discharge of all of the collected bales as illustrated in FIGURE 19.

Figure 1:
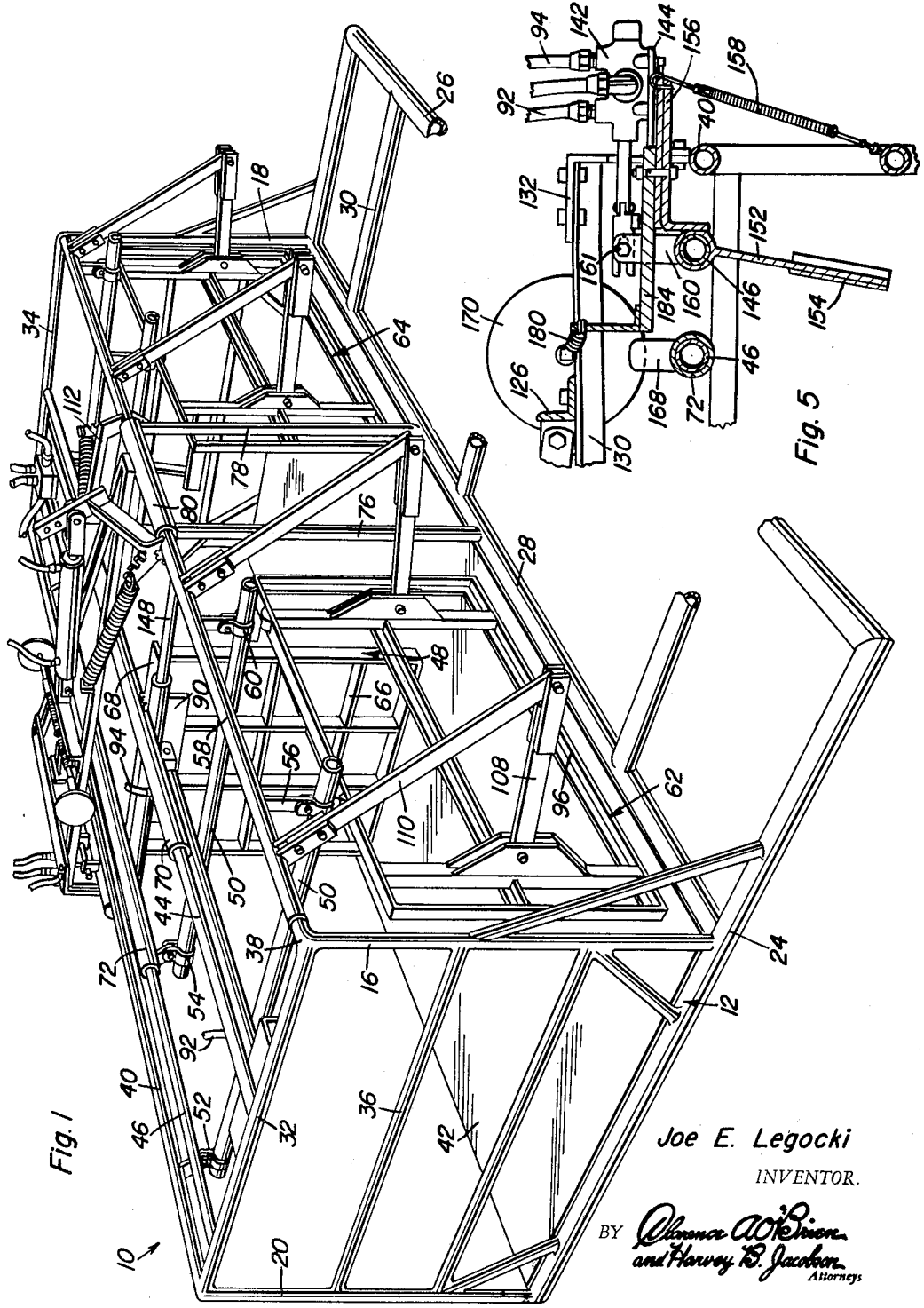
FIGURE 1 is a perspective view of the bale piler machine with certain parts cut away for sake of clarity.
Figure 2:
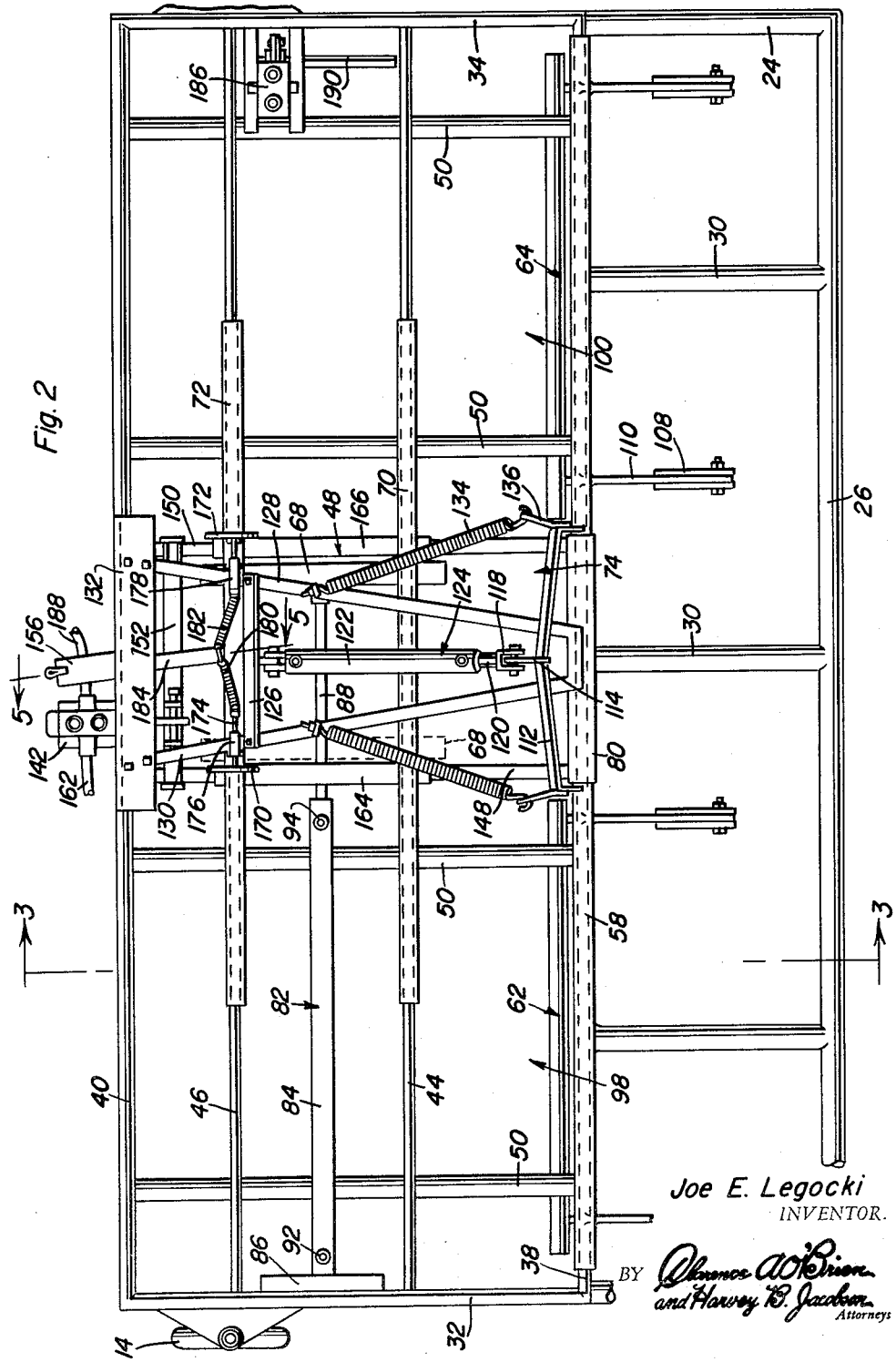
FIGURE 2 is a top plan view of the bale piler machine.
Figure 3:
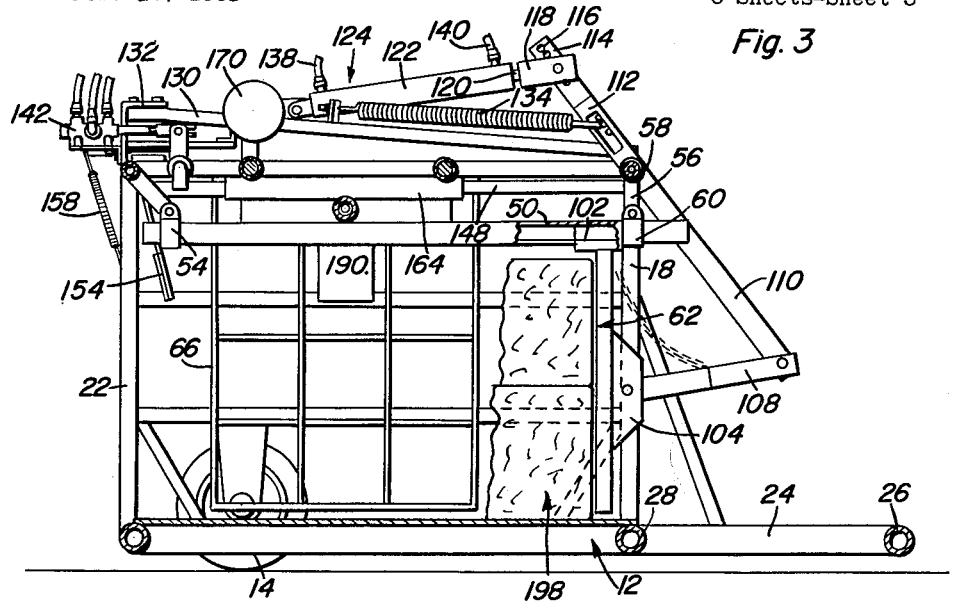
FIGURE 3 is a sectional view taken substantially through a plane indicated by section line 3—3 in FIGURE 2, wherein the machine is shown in a loading condition.

Referring now to the drawings in detail, FIGURES 1, 2 and 3 illustrate the bale piler machine which is generally referred to by reference numeral 10. The machine consists of a frame assembly generally referred to by reference numeral 12 which is supported in spaced relation above the ground by a pair of caster mounted wheels 14 disposed on the lateral sides of the frame assembly rearwardly thereof. The frame assembly 12 is preferably made up of tubular pipe members. Although a particular pipe construction will be described, it should be understood however that other types of construction may be resorted to within the purview of the present invention. The frame assembly 12 is accordingly made up of a pair of forward corner post members 16 and 18 and a similar pair of rear corner post members 20 and 22. Heavy frame members 24 are connected to the bottom of the post members 16 and 20 and 18 and 22 respectively and extend forwardly of the main portion of the frame assembly 12 to form with the forward frame member 26 a portion for connection by a suitable hitch arrangement to the baler and tractor with which the machine is associated. A bottom forward frame member 28 is therefore provided interconnecting the lower ends of the forward vertical post members 16 and 18 and also interconnected to the member 26 by a plurality of bracing members 30. The forward and rear post members are also interconnected at the top by upper side frame members 32 and 34. The sides are also suitably braced by brace members 36 interconnecting the forward and rear post members. Interconnecting the forward post members 16 and 18 in vertically spaced relation above the bottom frame membr 28 is a member 38 which constitutes also a rotatable journal support for mechanism to be described hereafter. A rear upper frame member 40 similarly interconnects the rear post members 20 and 22. A sheet metal bottom member 42 may therefore be connected to the bottom frame members 24 and 28 to form the floor of the bale piler machine. Also interconnecting the upper side members 32 and 34 are a pair of slide supporting frame members 44 and 46 by means of which a gate mechanism generally referred to by reference numeral 48 is slidably supported as will be hereafter described with greater detail. Also, a plurality of split tubular members 50 are suspended in parallel spaced relation to each other below the laterally extending frame members 38 and 40 and the slide members 44 and 46. Downwardly depending pivot projections 52 are connected to the rear frame member 40 and are pivotally connected to a collar element 54 connected to the slide support member 50. Pivot projections 56 are also connected to and depend from a tubular member 58 which is journaled on the frame member 38 so that the collar elements 60 connected to the forward end of the slide member 50 may be pivotally connected thereto. The slide member 50 as more clearly seen in FIGURE 3 is split at the underside thereof in order to slidably support a pair of pusher gate mechanisms generally referred to by reference numerals 62 and 64. The pivot collar support for the guide members 50 accommodates its rearward displacement when the tubular control member 58 is angularly displaced relative to the frame member 38 when the pusher gate mechanisms 62 and 64 are moved rearwardly of the frame assembly 12 for discharging the bales therefrom.

Referring now to FIGURES 1 and 2, it will be observed that the gate mechanism 48 is formed of any suitable construction such as the lattice 66 which is connected to and depends below an upper gate frame member 68. The gate frame member 68 is connected as by welding to a pair of elongated tubular sleeve members 70 and 72 which are slidably mounted on the slide frame members 44 and 46 respectively. The gate 48 is accordingly slidably displaceable between a position on the right as illustrated in FIGURES 1 and 2 to a position on the left as illustrated by dotted lines in FIGURE 2. The gate 48 accordingly defines between its two opposite positions, a bale receiving space 74 the entrance to which is defined by a pair of parallel upright frame members 76 and 78 interconnected between the lower frame member 28 and a sleeve element 80 disposed about the tubular control member 58 centrally thereof. In order to slidably displace the gate mechanism 48, a hydraulic operator mechanism generally referred to by reference numeral 82 is operatively connected to the gate mechanism 48 and includes a cylinder 84 fixed at one lateral end by the bracket member 86 to the frame assembly. Projecting out the other end of the cylinder 84 is the piston rod 88 which is connected to the gate mechanism 48 by the member 90. A pair of hydraulic conduits 92 and 94 are connected to the opposite ends of the cylinder 84 in order to control the movement of the piston disposed therein which is connected to the piston rod 88 for movement of the gate mechanism 48 between the illustrated positions.

Figure 4:
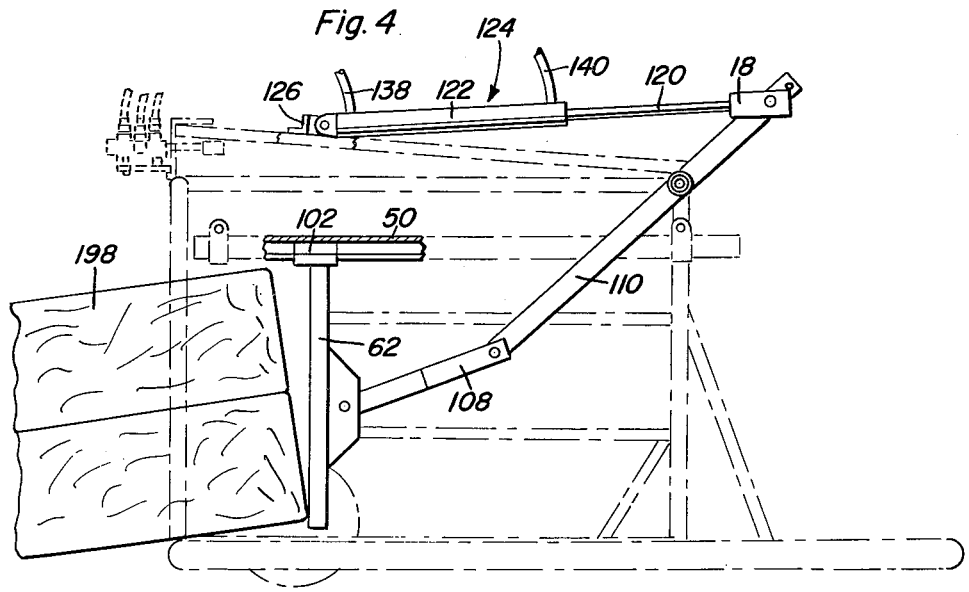
FIGURE 4 is a phantom side sectional view similar to that of FIGURE 3 but illustrating the machine in a bale discharging condition.

Referring now to FIGURES 1, 3 and 4, it will be observed that each of the pusher gate mechanisms 62 and 64 include a gate frame 96 of rectangular shape for the purpose of movement into the bale collection spaces 98 and 100 which are disposed on either lateral side of the receiving space 74 as seen more clearly in FIGURE 2. Connected to the frame 96 of each of the pusher gate mechanisms 62 and 64 are a pair of upwardly extending slide members 102 which are received within the tubular slide members 50 through the under slit thereof as more clearly seen in FIGURE 3. The gate mechanisms are normally disposed therefore at the forward side of the collection space 98 and 100 with the slide member 102 abutting against the forward pivot supporting collar element 60. Connected to the gate frame 96 are a pair of sets of forwardly projecting pivot ear members 104 to which a link assembly 108 is pivotally connected. The link assemblies 108 are in turn pivotally connected to the lower end of a lever assembly 110 which is pivotally connected to the frame assembly 12 by means of the control pipe member 58 which is rotatable on the frame member 38. It will therefore be apparent that by angular rotation of the control pipe member 58 the lever members 110 will be angularly displaced in a clockwise direction as viewed in FIGURES 3 and 4 to cause the gate mechanisms to be slidably displaced in a rearward direction through the link assemblies 108. Accordingly, connected to the control member 58 on either side of the centrally disposed sleeve element 80, are a pair of upwardly converging arms 112 interconnected with a part 114 including a plurality of adjustment apertures 116 to which a forward yoke portion 118 of a piston rod 120 is connected. The piston rod projects forwardly from the cylinder 122 of a hydraulic mechanism 124 with the rear portion of the cylinder 122 being pivotally connected to the frame assembly 12 by means of an angle member 126 interconnecting the frame members 128 and 130 which extend between and are connected to the sleeve element 80 and a rearwardly mounted bracket member 132 disposed centrally on the rear frame member 40 as more clearly seen in FIGURE 2. Accordingly, it will be apparent that when the piston disposed within the cylinder 122 is moved forwardly with respect thereto the piston rod 120 adjustably connected to the arm members 112 through the part 114 will cause angular displacement of the control member 58 in a direction to cause the linkage mechanism including the lever assemblies 110 and link assemblies 108 to cause the pusher gate mechanisms 62 and 64 to be slidably displaced rearwardly as illustrated in FIGURE 4. The piston rod 120 and the linkage mechanism and gate mechanisms connected thereto are biased to the position illustrated in FIGURE 3 by a pair of spring elements 134 which are adjustably anchored intermediate the ends of the frame members 128 and 130 at one end thereof while the other or forward end of the spring elements 134 are connected to rearwardly projecting ears 136 connected to the lateral ends of the arms 112 as more clearly seen in FIGURE 2. In order to control movement of the piston within the cylinder 122, a pair of hydraulic conduits 138 and 140 are connected to the opposite ends thereof so as to control movement of the pusher gate mechanisms 62 and 64 operatively connected to the hydraulic mechanism 124, as will be hereafter described in greater detail.

Referring now to FIGURES 2 and 5, it will be observed that a valve mechanism generally referred to by reference numeral 142 is supported on a plate 144 connected to the bracket member 132 and extending rearwardly therefrom. The valve mechanism 142 is provided for the purpose of controlling the hydraulic operator mechanism 82 for positioning the gate mechanism 48. Accordingly, pivotally supported by a frame member 146 which is interconnected between a pair of parallel frame members 148 and 150 extending between the bracket member 132 rearwardly of the frame and the sleeve element 80, is a trigger lever member 152 including an engaging portion 154 which is positioned rearwardly of the bale receiving space 74 adjacent the upper end thereof. The trigger member 152 has connected thereto a rearwardly extending portion 156 projecting rearwardly through a slot provided therefor within the bracket member 132. A spring element 158 connected to the frame and to the rear end of the portion 156 biases the trigger member 152 in a clockwise direction as viewed in FIGURE 5. Pivotal displacement of the trigger member 152 against the bias of spring 158 by bale engaging the engaging portion 154 thereof, will accordingly pivotally displace the lever member in a counterclockwise direction together with a pair of upstanding connectors 160 which are connected by means of a bolt member 161 to an actuator of the valve mechanism 142. Displacement of the trigger lever member 152 will accordingly open the valve mechanism in order to set the hydraulic operator mechanism 82 into operation. However, the valve mechanism 142 must be conditioned to alternatively supply fluid under pressure from the inlet conduit 162 connected thereto to the conduit 92 or the conduit 94 connected to the respective opposite ends of the cylinder 84 of the hydraulic operator mechanism 82. A reversing mechanism for reversing the connections of the valve mechanism 142 is therefore provided which will respond to shifting of the gate mechanism 48 from one position to the other. The gate mechanism 48, it will be recalled, is slidable between its positions by being connected to the elongated slide members 70 and 72 which are disposed above the gate mechanism 48 to which they are connected and are guidingly supported over the receiving space 74 by a pair of rollers 164 and 166. Connected to the elongated guide sleeve member 72 are a pair of upwardly extending tabs 168 which are spaced apart from each other and engage for slidable displacement purposes a pair of disk members 170 and 172 respectively which are slidably mounted by shaft elements 174 received within sleeves 176 and 178 respectively fixed to the frame members 130 and 128. The inner ends of the shaft members 174 connected to each of the disk members 170 and 172, have spring elements 180 and 182 connected thereto which in turn are connected to a lever element 184 pivotally mounted on the rearwardly extending portion 156 of the lever member 152 which lever element 184 has limited pivotal movement with respect to said portion 156. It will therefore be apparent that as the gate mechanism 48 moves from one position to the other, the upwardly projecting tabs 168 on slide member 72 connected to the gate mechanism 48, will engage the disk member 170 or 172 to tension either spring 180 or spring 182 to thereby pivotally displace the lever element 184 for laterally shifting the trip lever member 152 so that by any suitable connection to the valve mechanism 142 actuation of the trigger lever member 152 will cause the valve mechanism 142 to make the appropriate connection from the supply conduit 162 to the cylinder conduit 92 or 94 depending upon the position of the gate mechanism 48. It will therefore be understood, that each time the trigger lever member 152 is actuated, it will cause the hydraulic operator mechanism 82 to move the gate mechanism 48 to the opposite position or opposite side of the receiving space 74.

Control over the hydraulic operator mechanism 124 by means of which the pusher gate mechanisms 62 and 64 are actuated to discharge the bales from the machine, is provided by the valve mechanism 186 which is mounted on the right side of the collection space 100 or frame assembly 12 as more clearly seen in FIGURE 2. The valve mechanism 186 is connected to the supply conduits 138 and 140 for the hydraulic operator mechanism 124 and is also interconnected to a connecting fluid conduit 188 from the valve mechanism 142. The valve mechanism 186 is actuated by a second trigger lever member 190 which is pivotally mounted by the frame for engagement by an uppermost and most laterally displaced bale within the collection chamber 100 to thereby actuate the valve mechanism 186 to supply fluid under pressure to the hydraulic operator 124 through the conduit 138 causing the pusher gate mechanisms 62 and 64 to discharge the bales disposed within the collection spaces 98 and 100.

Figure 6:
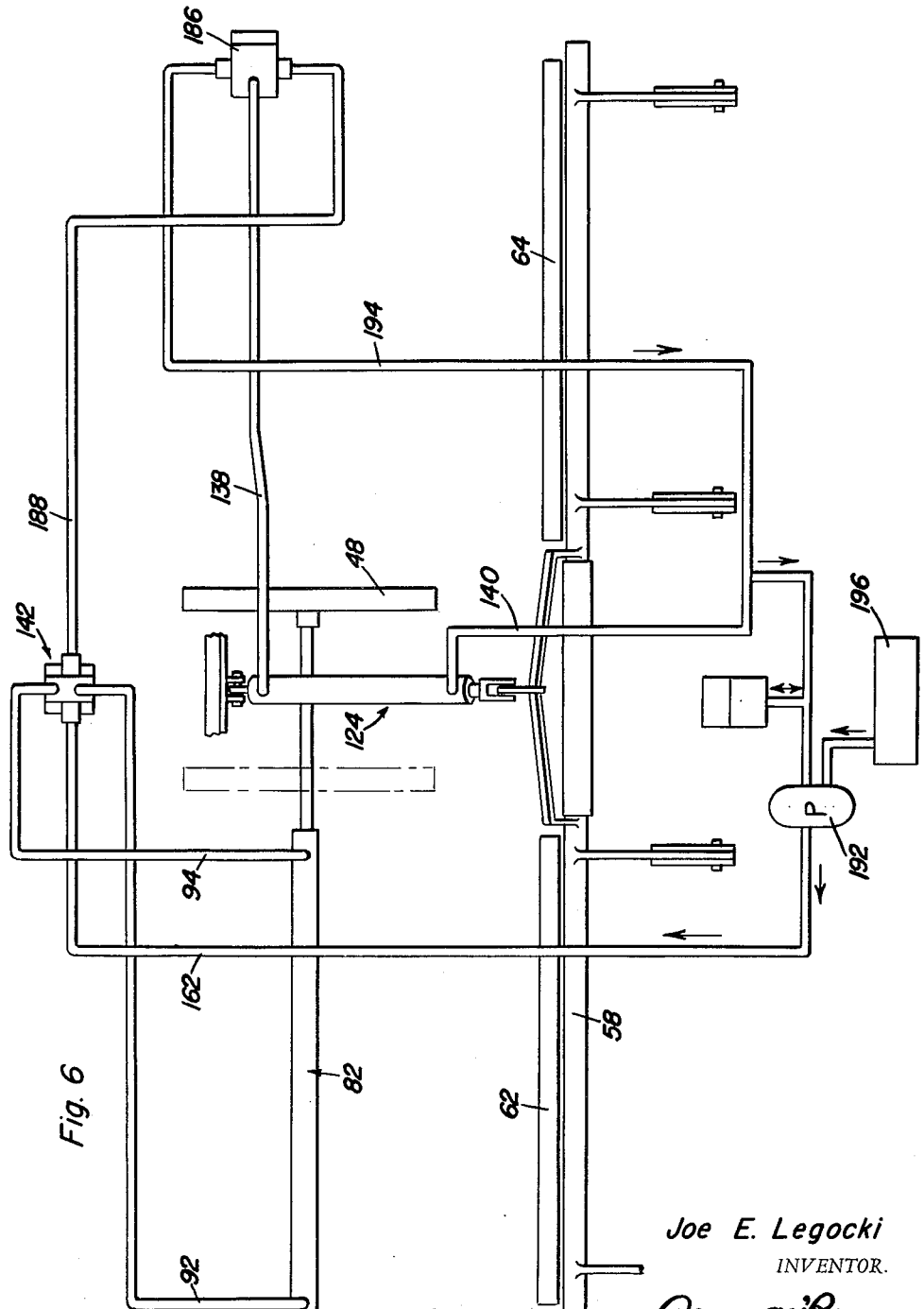
FIGURE 6 is a schematic hydraulic circuit diagram of the hydraulic control system for the machine.

Referring now to FIGURE 6 in particular, it will be observed that the value mechanisms 142 and 186 and the hydraulic operator mechanisms 82 and 124 are operatively interconnected for the automatic sequential operation which will be further described hereafter. A pump 192 is therefore provided for supply of fluid under pressure to the supply conduit 162 which is connected to an inlet port in the reversible valve mechanism 142. Accordingly, as was explained hereinbefore, fluid under pressure will be supplied either to conduit 92 or 94 connected to the valve mechanism 142 depending upon the conditioning of the valve mechanism by the movement of the gate mechanism 48 and after actuation of the trigger mechanism connected to the valve actuator by a bale engaging the trigger mechanism. The gate mechanism 48 will therefore shift between the positions illustrated by solid line and dotted line in FIGURE 6 each time the trigger mechanism is engaged by a bale. A supply conduit 188 also extends from the supply conduit 162 through the valve mechanism 142 to the second valve mechanism 186 which is normally in a position connecting the supply conduit 188 to the conduit 194 which is connected to the inlet of pump 192. A closed fluid circuit is thereby provided with make-up fluid supplied to the pump from a reservoir 196. The conduit 194 is also connected to the conduit 140 so that the hydraulic operator mechanism 124 will be in the condition to which it is biased by the springs 134. Accordingly, when the hydraulic system is energized by opening of the valve mechanism 142 by the trigger mechanism, only the hydraulic operator 82 will be actuated from one position to the other. However, when the trigger mechanism for the valve mechanism 186 is actuated, fluid from the supply conduit 188 will be connected to the conduit 138 which will cause displacement of the piston within the hydraulic operator 124 to thereby actuate the pusher gate mechanisms 62 and 64. It will therefore be apparent from FIGURES 3 and 4 that the bales 198 will be discharged from the open rear side of the machine frame assembly.

Figure 13:
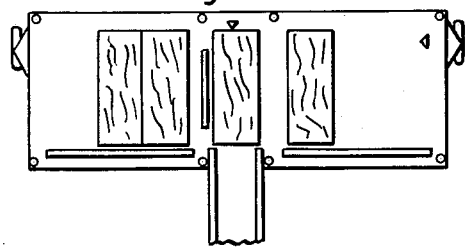
Figure 14:
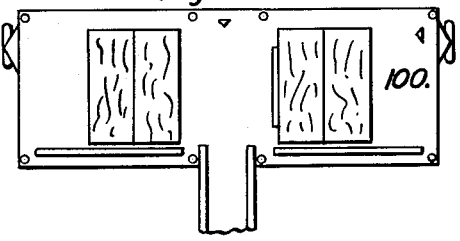
Figure 15:
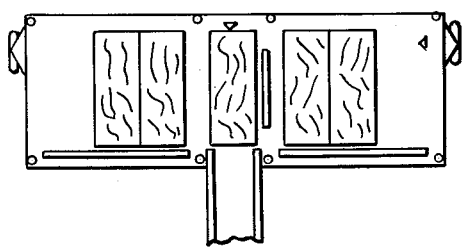
Figure 16:
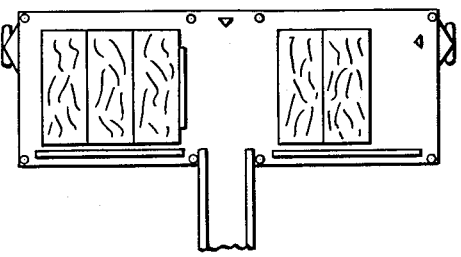
Figure 17:
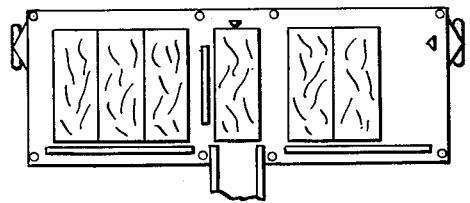
Figure 18:
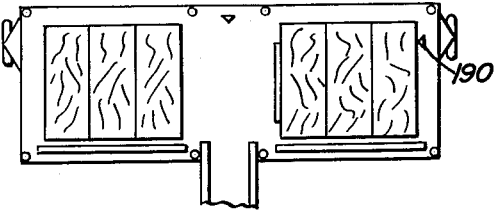
Figure 19:
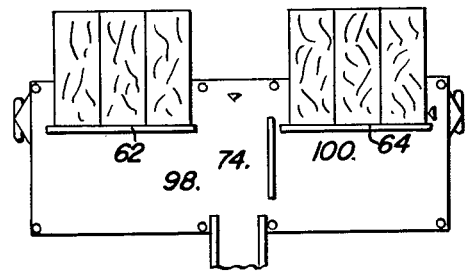

Operation of the machine will be apparent from the foregoing description. The sequence of the automatic machine operations will however be more clearly apparent by reference to FIGURES 7–19. In FIGURE 7, it will be observed that a tractor vehicle generally referred to by reference numeral 200 has connected thereto and trailing there behind a baler 202 from which the bales are discharged into the automatic bale windrowing machine 10 with the outlet chute 204 from the baler 202 being alined with the receiving space 74 of the machine 10 so as to discharge there into the bales. Although a row of bales is diagrammatically illustrated in FIGURE 7 filling the receiving space 74, as noted in the brief description of FIGURES 7–19, it will be appreciated that the machine may be designed as to size so as to receive only one bale in a single line within the receiving space 74, or any number of vertically stacked bales or rows of bales within said receiving space. When the receiving space is fully loaded as diagrammatically illustrated in FIGURE 7, the trigger mechanism 152 diagrammatically illustrated is engaged to initiate operation of the hydraulic operator 82 which is operatively connected to the gate mechanism 48. As seen in FIGURE 8, the gate mechanism 48 has laterally displaced the bales from the receiving space 74 into the collection space 98 on one side thereof. In FIGURE 9 a second load of bales is received within the receiving space 74 and engages the trigger mechanism 152 whereupon the gate mechanism 48 shifts the second load of bales into the collection space 100 as seen in FIGURE 10. As seen from FIGURES 11 and 12, a third load of bales is moved into the collection space 98 while from FIGURES 13 and 14 a fourth load of bales is moved into the collection space 100. From FIGURES 15, 16 and 17, it will be observed that the collection space 98 is fully loaded while a final load is set to be delivered from the receiving space 74 into the collection space 100 as finally shown in FIGURE 18. When the collection space 100 is fully loaded as shown in FIGURE 18, the trigger mechanism 190 is actuated whereupon the pusher gate mechanism 62 and 64 are caused to be actuated to rearwardly discharge the bales from the loaded collection chambers 98 and 100 as seen in FIGURE 19. It should be understood that the machine of the present invention may be designed so as to accommodate any number of bales within the collection spaces 98 and 100 and accommodate a single row of bales within the receiving space 74 the number received within the receiving space being dependent upon the width of the machine between its forward and rear sides and the height to which the bales may be stacked.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An automatic bale piler comprising carrier frame means adapted to be hitched to a baler, including a bale receiving space located centrally within the frame means for receiving there within a row of bales consisting of a predetermined number of bales, two bale collecting spaces located laterally, one on each side of said bale receiving space and in line therewith, gate means movably mounted by the frame means for lateral movement across the receiving space and between the two collecting spaces, gate activating means secured at the rear of the receiving space and responsive, upon contact therewith of the rearmost bale of the row, to automatically cause lateral movement of the gate across the receiving space thus transferring the bales from the receiving space to a collecting space, each subsequent bale introduced into the receiving space pushing the preceding bale rearwardly toward the gate-activating means, said gate being operative so as to alternately feed bales into the two collecting spaces, bale expelling means comprising two enlarged panels, each movably mounted on the frame adjacent the forward edge of one of the collecting spaces, second actuating means for automatically causing rearward movement of said expelling means, said second activating means secured at the far side of the collecting space normally receiving the even numbered rows of bales, such as the second and fourth row, so as to insure an even loading of the collecting spaces before discharge of the bales therefrom, each subsequent row introduced into the collecting spaces by the gate means pushing the preceding row before it until the means for activating the expelling means is contacted and the expelling means are activated so as to move rearwardly and discharge the enclosed bales.

2. The combination of claim 1 including an elongated member rotatably secured on the upper front portion of the frame and spanning both of the bale expelling panels, pivot means securing each panel to said rotatable members, said pivot means providing for horizontal rearward movement of the expelling panels in response to the rotation of the elongated member.

3. The combination of claim 1 including an upwardly extending member fixedly secured to the rotatable member at approximately the center thereof, said upwardly extending member having its upper end pivotally secured to a piston rod projecting from a cylinder of a hydraulic mechanism secured to the top of the frame, said hydraulic mechanism responsive to the second activating means for causing rotation of the rotable member and subsequent rearward movement of the expelling means.

4. The combination of claim 1 including a plurality of split tubular members secured to the frame means and extending from front to rear within each collecting space with the split portion thereof extending downwardly, and a plurality of slide members fixedly secured to the top of each expelling means and slidably received within the split tubular members so as to support and guide said expelling means.

5. The combination of claim 1 including a plurality of split tublar members secured to the frame means and extending from front to rear within each collecting space with the split portion thereof extending downwardly, and a plurality of slide members fixedly secured to the top of each expelling means and slidably received within the split tubular members so as to support and guide said expelling means.

6. The combination of claim 1 wherein said receiving space is of a height so as to receive vertically stacked rows of bales, said gate activating means orientated so as to be engaged solely by the rear bale in the uppermost row so as to insure a complete filling of the receiving space prior to the operation of the gate, said collecting spaces being of a height substantially equal to the height of the receiving space so as to receive the stacked rows therein.

References Cited in the file of this patent

UNITED STATES PATENTS

| | | |
|---|---|---|
| 2,703,653 | Thomson | Mar. 8, 1955 |
| 2,761,578 | Brownlee | Sept. 4, 1956 |
| 2,822,659 | Moore | Feb. 11, 1958 |
| 2,857,036 | Leiser | Oct. 21, 1958 |
| 2,870,922 | Thomson | Jan. 27, 1959 |
| 2,971,318 | Salem | Feb. 14, 1961 |
| 2,993,583 | Sykes | July 25, 1961 |